(12) United States Patent
Janakiraman et al.

(10) Patent No.: US 6,374,331 B1
(45) Date of Patent: Apr. 16, 2002

(54) DISTRIBUTED DIRECTORY CACHE COHERENCE MULTI-PROCESSOR COMPUTER ARCHITECTURE

(75) Inventors: Gopalakrishnan Janakiraman, Fremont; Tsen-Gong Jim Hsu, Cupertino; Padmanabha I. Venkitakrishnan; Rajendra Kumar, both of Sunnyvale, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/223,469

(22) Filed: Dec. 30, 1998

(51) Int. Cl.[7] .................................................. G06F 12/00
(52) U.S. Cl. ........................................ 711/141; 711/148
(58) Field of Search ................................. 711/141, 147, 711/148, 156

(56) References Cited

U.S. PATENT DOCUMENTS

| | | | | |
|---|---|---|---|---|
| 5,535,366 A | * | 7/1996 | Pfeiffer et al. ............... 395/486 |
| 5,734,922 A | * | 3/1998 | Hagersten et al. ............. 712/37 |
| 5,751,987 A | * | 5/1998 | Mahant-Shetti et al. ........ 711/5 |
| 5,864,671 A | * | 1/1999 | Hagersten et al. ........... 709/213 |
| 5,982,697 A | * | 11/1999 | Williams et al. ........ 365/230.03 |

* cited by examiner

Primary Examiner—Matthew Kim
Assistant Examiner—C. P. Chace

(57) ABSTRACT

A network of integrated communication switches and coherence controllers is provided which interconnected nodes in a cache-coherent multi-processor computer architecture. The nodes contain multiple processors operatively connected to associated memory units through memory controllers. The communication switches and coherence controllers has associated coherence directories which maintain coherence information for all memory lines that are "homed" in the nodes that are directly connected to the particular communication switch and coherence controller.

18 Claims, 8 Drawing Sheets

DISTRIBUTED DIRECTORY CACHE COHERENCE MULTI-PROCESSOR COMPUTER ARCHITECTURE

TECHNICAL FIELD

The present invention relates generally to high-performance parallel multi-processor computer systems and more particularly to a distributed directory cache coherence architecture where the coherence directories are not maintained at the location of memory unit.

BACKGROUND ART

Many high-performance parallel multi-processor computer systems are built as a number of nodes interconnected by a general interconnection network (e.g., crossbar and hypercube), where each node contains a subset of the processors and memory in the system. While the memory in the system is distributed, several of these systems (called NUMA systems for Non-Uniform Memory Architecture) support a shared memory abstraction where all the memory in the system appears as a large memory common to all processors in the system. To support high-performance, these systems typically allow processors to maintain copies of memory data in their local caches. Since multiple processors can cache the same data, these systems must incorporate a cache coherence mechanism to keep the copies coherent. These cache-coherent systems are referred to as ccNUMA systems and examples are DASH and FLASH from Stanford University, ORIGIN from Silicon Graphics, STING from Sequent Computers, and NUMAL from Data General.

Coherence is maintained in ceNUMA systems using a directory-based coherence protocol. With coherence implemented in hardware, special hardware coherence controllers maintain the coherence directory and execute the coherence protocol. To support better performance, the coherence protocol is usually distributed among the nodes. With current solutions, a coherence controller is associated with each memory unit that manages the coherence of data mapped to that memory unit. Each line of memory (typically a portion of memory tens of bytes in size) is assigned a "home node", which manages the sharing of that memory line, and guarantees its coherence.

The home node maintains a directory, which identifies the nodes that possess a copy of the memory line. When a node requires a copy of the memory line, it requests the memory line from the home node. The home node supplies the data from its memory if its memory has the latest data. If another node has the latest copy of the data, the home node directs this node to forward the data to the requesting node. The home node employs a coherence protocol to ensure that when a node writes a new value to the memory line, all other nodes see this latest value. Coherence controllers implement this coherence functionality.

While existing ccNUMA systems differ in the organization of the node and the system topology, they are identical in two key aspects of their coherence architecture. First, they implement a coherence controller for each memory unit, which maintains coherence of all memory lines in that memory unit. Second, the functionality of the coherence controller is integrated with the functionality of the memory controller of the associated memory unit. However, a solution based on the collocation of a coherence controller with each memory unit is not well matched with several trends in multi-processor computer system architecture. Since these coherence architectures require a coherence controller for each memory unit, the cost of the coherence mechanism is high in system architectures with high ratios of memory units to processor units. For example, the FLASH system requires as many coherence controllers as there are processors. While the cost of the coherence mechanism is lower when the system architecture has lower ratios of memory units to processors, these systems may not support the low-latency, high-bandwidth access to memory required for high-performance ccNUMA systems. One trend is to meet the ever-increasing memory bandwidth requirements of processors by using node designs with higher ratios of memory units to processor units. With as many coherence controllers as memory units, the large number of coherence controllers increases the cost of the system.

Integrating the coherence controller functionality with the memory controller functionality (as in these coherence architectures) may also not be a suitable approach with next generation processors where the memory or the memory controller is integrated with the processor on the same chip. In future processor architectures the memory (or the memory controller) will be integrated on the same chip as the processor to bridge the latency and bandwidth gap between the processor and memory. When memory is on the same chip as the processor, it may not be feasible to collocate the coherence control with the memory on the same chip. Such an approach would also disallow the tuning of the coherence protocol to meet requirements of specific ccNUMA system designs.

A coherence architecture where coherence directories and control are located in nodes at the site of memory may also result in longer access to remote data when the nodes are situated at the endpoints of the network. When a node requires access to data that is in a cache or memory in another node's processor, a message must first traverse the network from the requesting node to the node maintaining the directory. Then, the node maintaining the directory must send another message to the node with the data. Finally, the data must flow from the node with the data to the node requesting the data. This shows that it may not be desirable to collocate coherence controllers with memory units because coherence messages (between coherence controllers) must travel between endpoints of the network and thereby increase the latency of remote memory accesses.

A solution has long been sought which would use fewer coherence controllers, be viable for systems based on processors with integrated memory, and reduce the latency of coherence transactions.

DISCLOSURE OF THE INVENTION

The present invention provides a network of communication switches interconnecting the nodes in a cache-coherent multi-processor computer architecture. The nodes connect to communication switches through communication links to form the network. Coherence directories are at the communication switches and integrate the coherence controls into the communication switches. The coherence directories at the communication switch maintain coherence information for all memory lines that are "homed" in the nodes that are directly connected to the communication switch.

The present invention provides fewer coherence controllers, is a viable approach for systems based on processors with integrated memory, and also reduces the latency of several coherence transactions.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
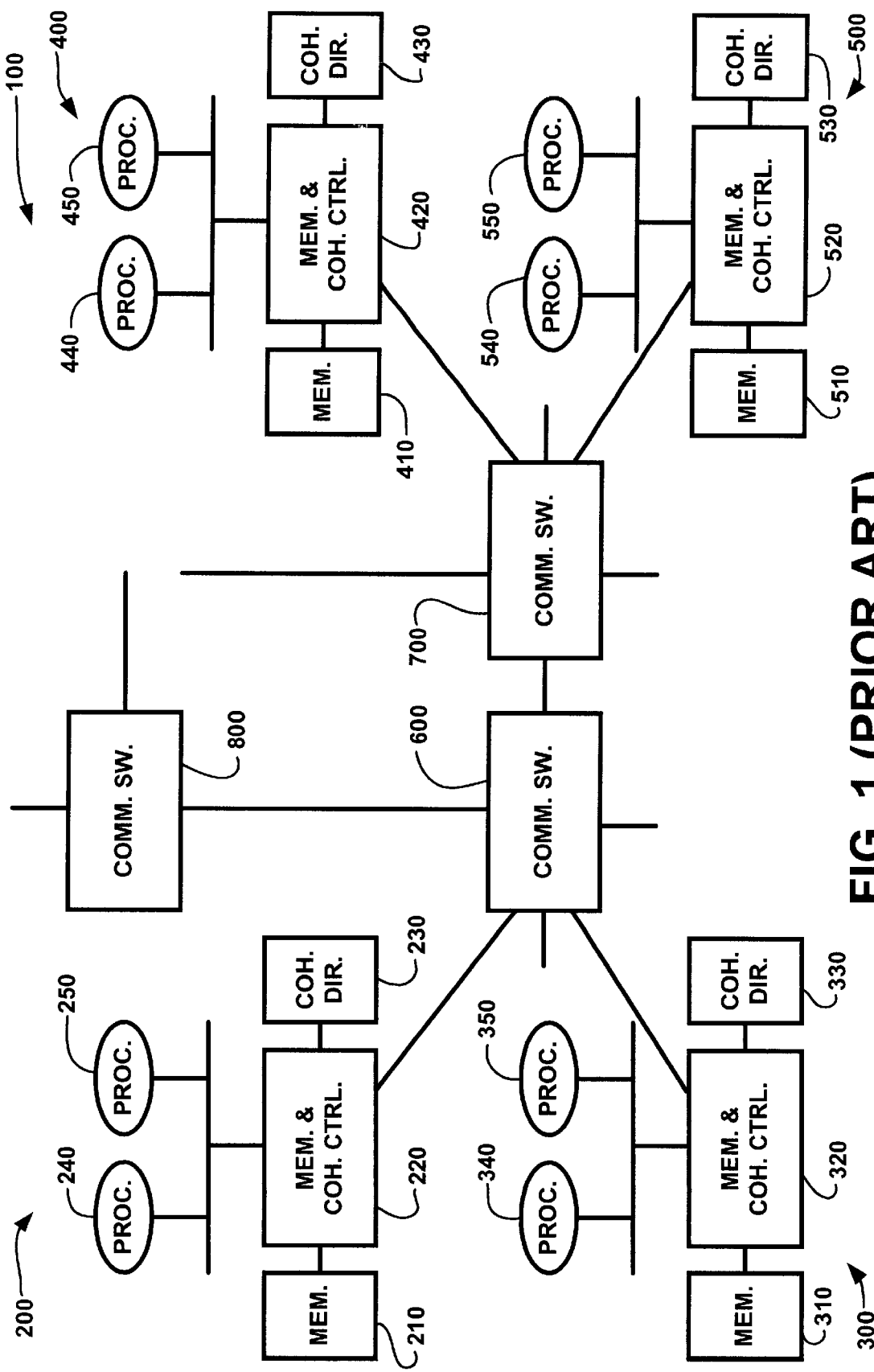
FIG. 1 (PRIOR ART) is a multi-processor computer system with the coherence control at the memory controller.

Referring now to FIG. 1 (PRIOR ART), therein is shown a cache-coherent NUMA (ccNUMA) system 100. The ccNUMA system 100 has a plurality of nodes 200, 300, 400, and 500. The nodes 200 and 300 are connected to a communication switch 600. The nodes 400 and 500 are connected to a communication switch 700. The communication switches 600 and 700 are part of a network which includes additional communication switches, such as the communication switch 800.

While different ccNUMA systems differ in the organization of the nodes and in their system topology, they are identical in two key aspects of their coherent architecture. First, they implement a coherence controller for each memory unit. This maintains coherence of all memory lines in that memory unit. Second, the functionality of the coherence controller is integrated with the functionality of the memory controller of the associated memory unit.

In the ccNUMA system 100, the nodes 200, 300, 400, and 500 contain respective memory units 210, 310, 410, and 510. The memory units 210, 310, 410, and 510 are respectively operatively connected to memory and coherence controllers 220, 320, 420, and 520.

Further, in the ccNUMA system 100, each line of memory (typically a chunk of memory tens of bytes in size) is assigned a "home node", such as the node 200, which manages the sharing of that memory line and guarantees its coherence. The home node maintains a directory which identifies the nodes that possess a copy of that memory line. In the nodes 200, 300, 400, and 500, the coherence directories are respectively 230, 330, 430, and 530. When a node requires a copy of a memory line, it requests the memory line from the home node. The home node supplies the data from its memory unit if it has the latest data. If another node has the latest copy of the data, the home node directs this node to forward the data to the requesting node. The home node employs a coherence protocol to ensure that when a node writes a new value to the memory line, all other nodes see this latest value. The coherence controllers, which are a part of the memory and coherence controllers 220, 320, 420, and 520, implement this coherence functionality.

The memory and coherence controllers 220 are operatively connected to a number of processors, such as processors 240 and 250. The memory and coherence controllers 320 are operatively connected to the processors 340 and 350. The memory and coherence controllers 420 are operatively connected to processors 440 and 450. And the memory and coherence controllers 520 are operatively connected to the processors 540 and 550.

Since these coherence architectures require a coherence controller for each memory unit, the cost of the coherence mechanism is high in system architectures with high ratios of memory units to processor units. For example, the FLASH system requires as many coherence controllers as there are processors. While the cost of the coherence controllers is lower when the system architecture has lower ratios of memory units to processors, these systems may not support low-latency, high-bandwidth access to memory required for high performance ccNUMA systems. Further, integrating the coherence controller functionality with the memory controller functionality, as often occurs in ccNUMA systems, may not be suitable for next generation processors where the memory or memory controller is integrated with the processor on the same integrated circuit. In these integrated circuits, the control for the on-chip memory will be on the integrated circuit. Integrating the coherence control on the chip will not allow the flexibility of tuning the coherence protocol for the specific ccNUMA system.

A coherence architecture where coherence directories and control are located at the site of memory unit may also result in longer access to remote data when nodes are situated at the end points of the network. Commercial systems have typically been built in hierarchical topologies where the nodes are at the leaves, or end points, of the network. In these systems, memory and coherence directories are located at the end points of the network. When a node requires access to data that is in a cache in another node's processor, the message must first traverse the network from the requesting node to the node maintaining the directory. Then, the node maintaining the directory must send another message to the node with the data. Finally, the data must flow from the node with the data to the node requesting the data.

Figure 2:
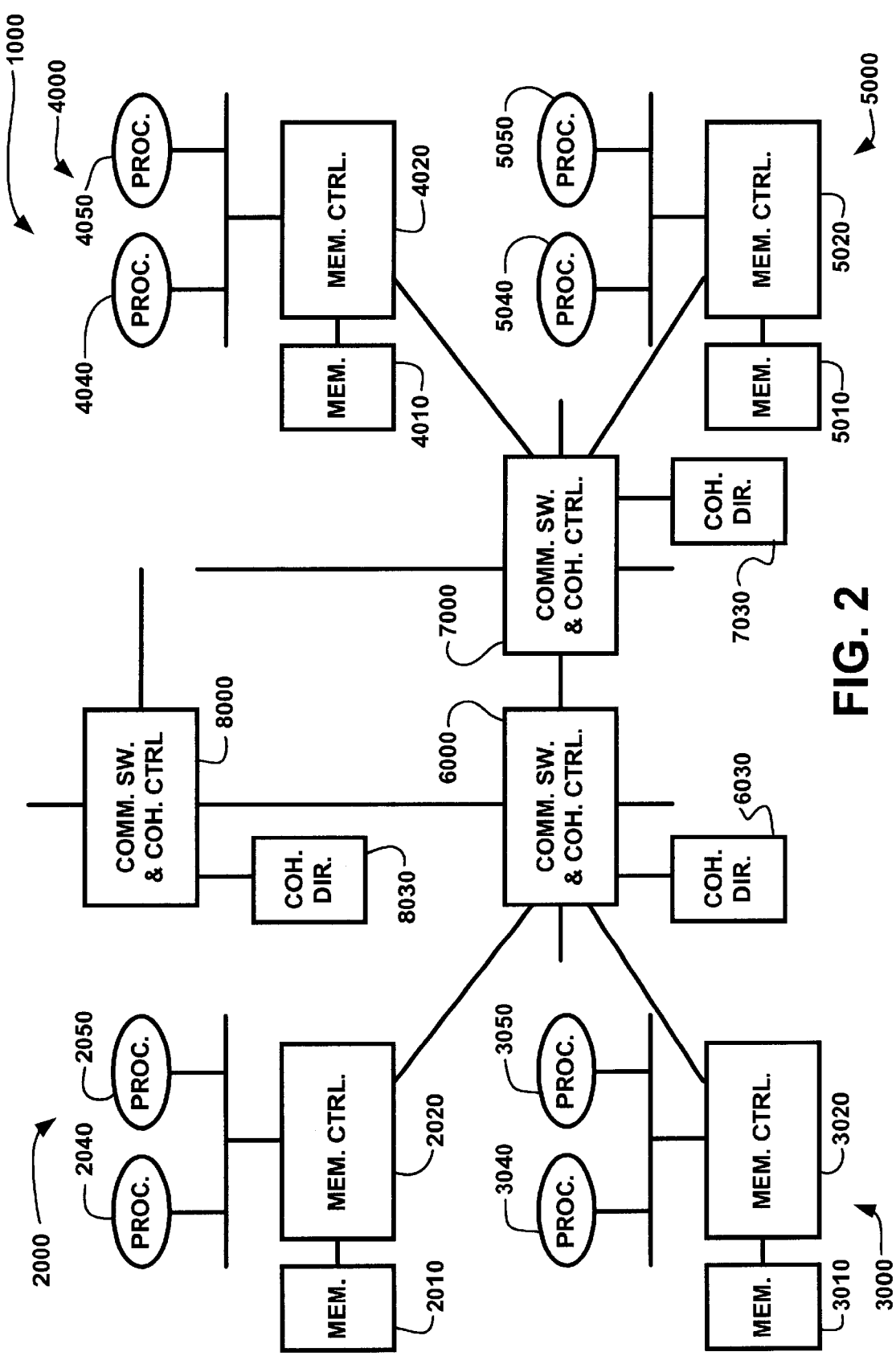
FIG. 2 is the multi-processor computer system of the present invention with coherence controllers at the communications switches.

Referring now to FIG. 2, therein is shown cNUMA system 1000 of the present invention. The ccNUMA system 1000 has nodes 2000, 3000, 4000, and 5000. The nodes 2000 and 3000 are connected to a communication switch, which combines the coherence control in an integrated communication switch and coherence controller 6000. The nodes 4000 and 5000 are connected to an integrated communication switch and coherence controller 7000. The communication switch and coherence controllers 6000 and 7000 are connected to other switches such as the integrated communication switch and coherence controller 8000 in a network.

The node 2000 has a memory unit 2010 which is operatively connected to a memory controller 2020 which is operatively connected to the communication switch and coherence controller 6000. The node 3000 has a memory unit 3010 which is operatively connected to a memory controller 3020 which is operatively connected to the communication switch and coherence controller 6000. The node 4000 has a memory unit 4010 which is operatively connected to a memory controller 4020 which is operatively connected to the communication switch and coherence controller 7000. And the node 5000 has a memory unit 5010 which is operatively connected to a memory controller 5020 which is operatively connected to the communication switch and coherence controller 7000.

At each of the communication switches and coherence controllers 6000, 7000, and 8000 there is a respective coherence directory 6030, 7030, and 8030. The coherence directory at the communication switch maintains coherence information for all memory lines that are "homed" in the nodes that are directly connected to the particular communication switch. The communication switch services read and write requests to these memory lines (as does the home node in the traditional architecture shown in FIG. 1 (PRIOR ART)). Thus, coherence directory 6030, operatively connected to the communication switch and coherence controller 6000, maintains coherence information for all memory lines that are in the memory unit 2010 in node 2000 and in the memory unit 3010 in the node 3000.

The memory controller 2020 has operatively connected thereto processors such as processor 2040 and 2050. The memory controller 3020 has operatively connected thereto processors such as processor 3040 and 3050. The memory controller 4020 has operatively connected thereto processors such as processor 4040 and 4050. And, the memory controller 5020 has operatively connected thereto processors such as processor 5040 and 5050.

When a processor, such as the processor 2040, misses in its cache, it issues an access to memory. The access may be to a memory line that is mapped (homed) to its local memory unit, such as the memory unit 2010, or to a memory line that is mapped to a memory in another node, such as the remote memory unit 3010. The manner in which these accesses are serviced is different in the ccNUMA system 1000 where the coherence controller is not collocated with the memory controller than in the ccNUMA system shown in FIG. 1 (PRIOR ART).

Figure 3:
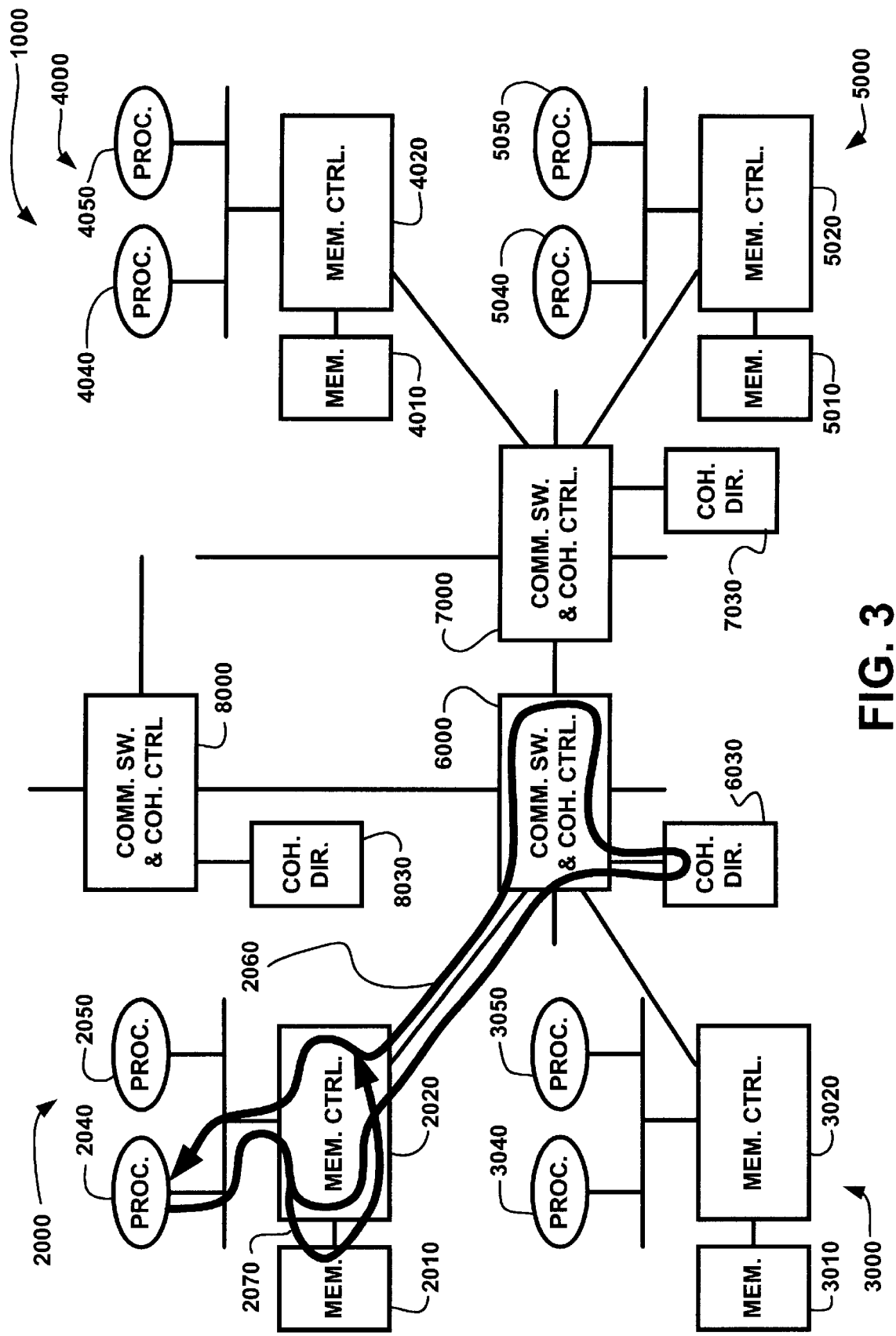
FIG. 3 is the multi-processor computer system of the present invention while accessing memory maintained in the local memory unit.

Referring now to FIG. 3, therein is shown the ccNUMA system 1000 when the access is to a memory line that is maintained in the local memory unit 2020. The processor 2040 (or its associated network interface) sends a request for access to the communication switch and coherence controller 6000 maintaining the coherency directory 6030 along the route indicated by the arrow 2060. At the same time, the local memory unit 2010 is concurrently accessed along the route indicated by the arrow 2070. On receiving the request, the coherence control in the communication switch and coherence controller 6000 look up the directory entry associated with the requested memory line in the coherence director 6030. If the directory entry indicates that the value maintained in the memory unit 2010 is valid, a message is sent back to the requesting node 2000 allowing it to use the data read from its local memory unit 2010. Otherwise, a message is sent to the requesting node 2000 instructing it to discard the data read from its local memory unit 2010. In addition, the communication switch and coherence controller 6000 identifies the node that has the current copy of the data and employs a traditional coherence protocol to transfer the memory line to the requesting node.

Figure 4:
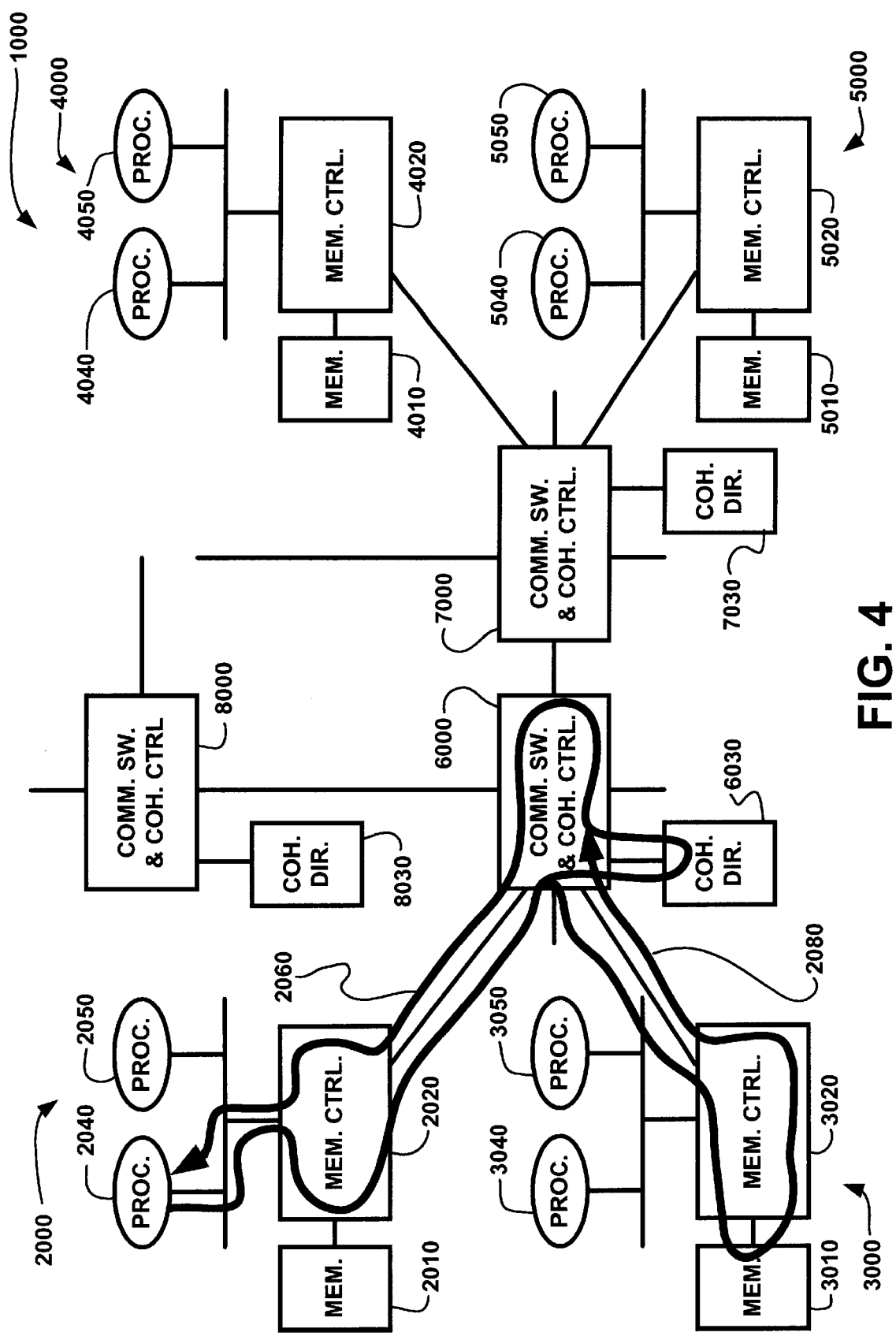
FIG. 4 is the multi-processor computer system of the present invention while accessing data maintained in a remote memory unit.

Referring now to FIG. 4, therein is shown the ccNUMA system 1000 when the access to a memory line that is maintained in a remote memory, such as the memory unit 3010. The processor 2040 (or its associated network interface) sends a request for access to the communication switch and coherence controller maintaining the directory entry for that memory line, such as the communication switch and coherence controller 6000. On receiving the request, along the route indicated by the arrow 2060, the communication switch and coherence controller 6000 looks up the directory entry in the coherence directory 6030 associated with the requested memory line. If the directory entry indicates that the value maintained in memory is valid, a message is sent to the node, such as the node 3000, that maintains the memory unit 3010 containing the memory line. The node 3000 reads the requested memory line from its memory unit 3010 and sends it in a data message along the route indicated by the arrow 2080 to the requesting node 2000. This data message is routed through the communication switch and coherence controller 6000 which maintains the coherence directory 6030, allowing it to identify that the access has been completed.

Figure 5:
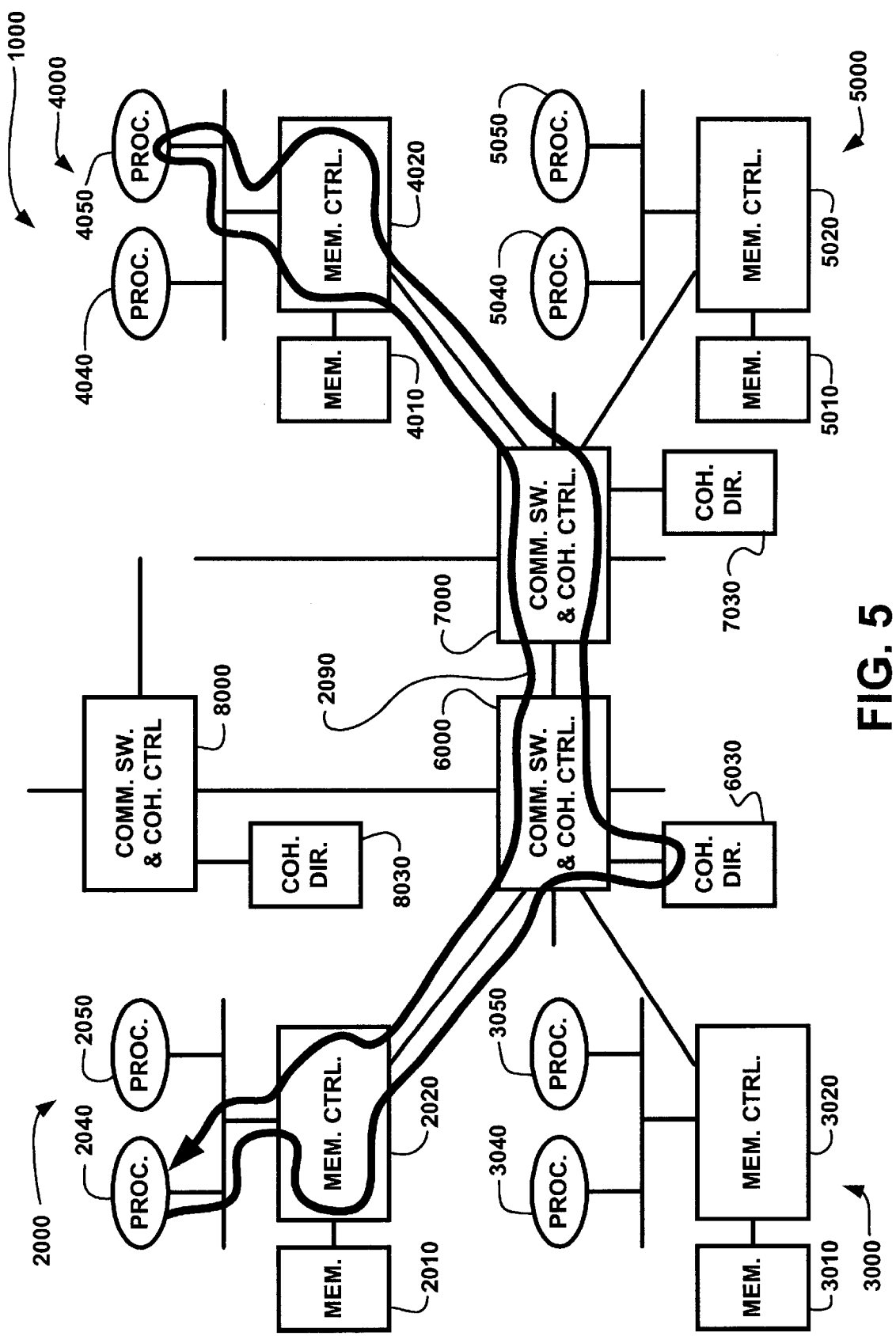
FIG. 5 is the multi-processor computer system of the present invention while accessing data valid only in a remote processor cache.

Referring now to FIG. 5, therein is shown the ccNUMA system 1000 when the directory entry in the coherence directory 6030 indicates that the value maintained in memory is not valid. The coherence control in the communication switch and coherence controller 6000 identifies the node, such as the node 4000, that has the current copy of the data and employs a traditional coherence protocol to transfer the memory line to the requesting node along the route indicated by the arrow 2090. The arrow 2090 indicates that the request from processor 2040 is sent to the communication switch and coherence controller 6000 which forwards the request (after looking up the coherency directory 6030) to the node 4000 through the communication switch and coherency control 7000. The data reply message from the processor 4050 is sent to processor 2040 through the communication switch and coherence controller 7000 and the communication switch and controller 6000.

In all cases, if the data message along the route indicated by arrow 2090 does not pass through the communication switch maintaining the directory 6030, the coherence protocol can be modified to explicitly notify the coherence control if the access has been serviced.

From the foregoing description of the ccNUMA system 1000, it would be evident to those skilled in the art that there are two key differences in the way accesses are serviced.

First, a message must be sent to the communication switch in the network even when the memory line being accessed is mapped to the local memory. In the traditional ccNUMA system 100, the coherence directory is collocated with the memory and a message is sent to the network only if the directory entry for the memory line indicates that the value in memory is not valid. While a message must always be sent to the network in the ccNUMA system 1000, this action may not increase the latency of the access. As previously indicated, the memory line can be read from the local memory unit concurrent with the sending of the message through the communication switch in the network. Since reading the large memory unit is likely to be slower than reading the smaller directory memory, the response from the coherence controller may be received before the memory line is read from the local memory.

Second, in the ccNUMA system 1000, when a coherence controller receives a request for a memory line and the memory line is valid in memory, a network message must be sent to the node with the memory directing it to send the memory line to the requesting node. In the ccNUMA system 100, the coherence controller and memory controller are collocated and the network message is not needed.

In addition to serving the request for the memory lines, coherence controllers must also handle memory lines that are written back to the memory by processes (mostly to free space in caches). When a coherence controller receives such a write back message with the ccNUMA system 1000, it forwards the data to the node containing the memory so that memory is updated. The directory entry for that memory line is also updated to indicate that the value for the memory line in memory is valid.

Figure 6:
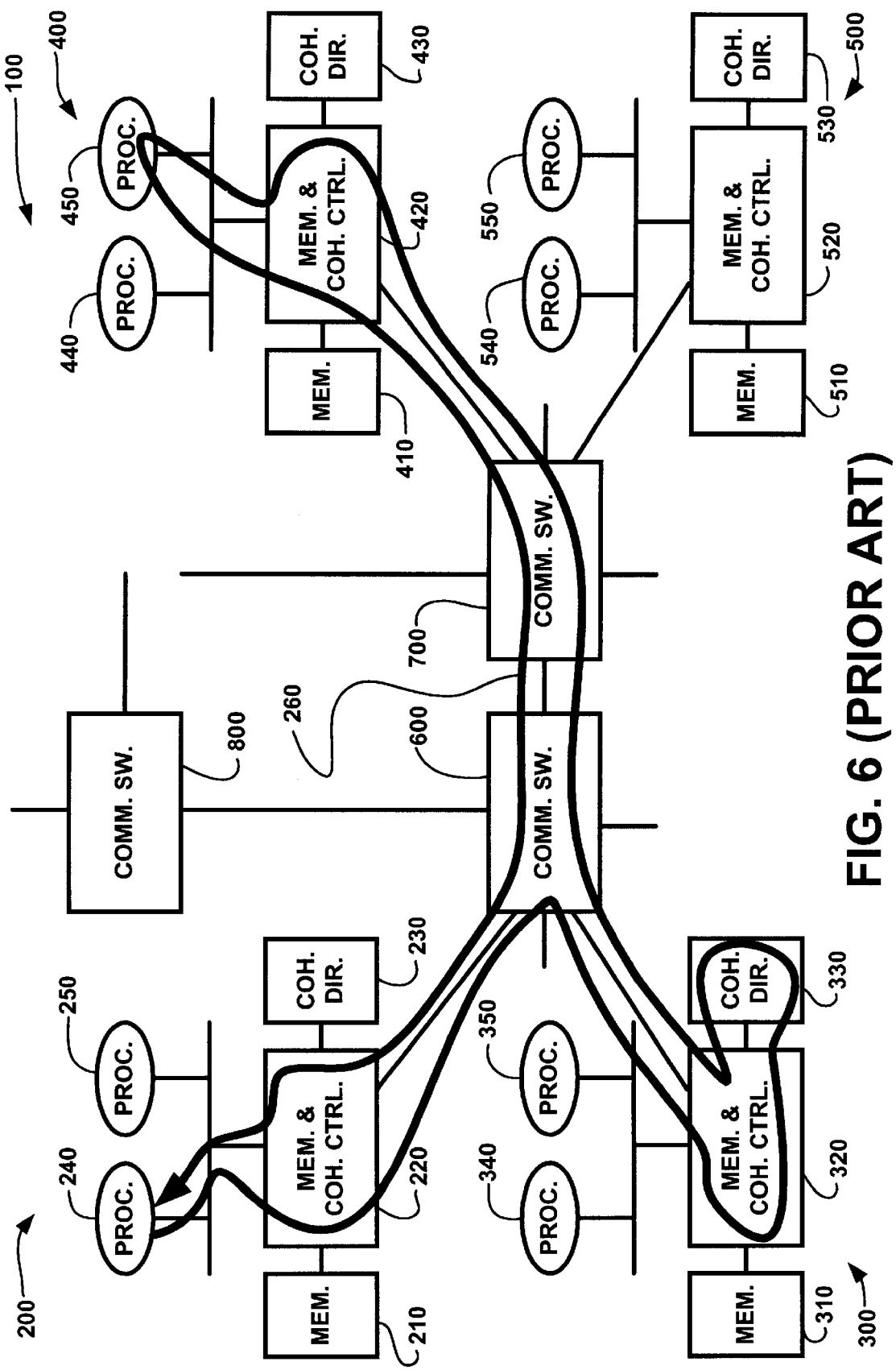
FIG. 6 (PRIOR ART) is the FIG. 1 (PRIOR ART) multi-processor computer system while accessing data valid only in a remote processor cache.

Referring now to FIG. 6, there is shown the ccNU system 100 when the access is to a memory line in the cache of a remote processor, such as processor 450. The access would be along the route shown by the arrow 260 where the node 200 issues an access to a memory line which is maintained in the memory unit 310 in the node 300. If the current value of the memory line is valid only in another node, such as the node 400, and not in the memory unit 310 at the node 300 (i.e., the node 400 last wrote to the memory line), then the value for the memory line in the node 400 must be returned to the node 200.

The message from the node 200 must first traverse the network to the node 300. From its entry for the memory line in the coherence directory 330, the node 300 determines that a valid copy of the memory line resides only in the processor 450 in the node 400. This message traverse the network along the route indicated by the arrow 260 from the node 300 to the node 400. When the node 400 receives the request, it supplies the data in a data message. This data message must traverse the network from the node 400 to the node 200. Thus, three network traversals are required to satisfy this access as indicated by the arrow 260 of the ccNUMA system 100 shown in FIG. 5 compared to the two traversals as indicated by the arrow 2090 of the ccNUMA system 1000 shown in FIG. 4.

In the ccN UMA system 1000, since the coherence control and directory are maintained in the communication switch, the request message is forwarded to the node 4000 by the communication switch and coherence controller 6000 without visiting the node 3000. The node 4000 supplies the data to the node 2000 with a data message. Thus, only two network transversals are needed. It must be noted that reducing the latency of these types of accesses (where the data that is being accessed exists only in some other processor's cache) is very crucial in high-performance systems. As new technology allows larger processor caches, these types of accesses are likely to dominate. The system architecture must support these types of accesses efficiently to support high performance.

Figure 7:
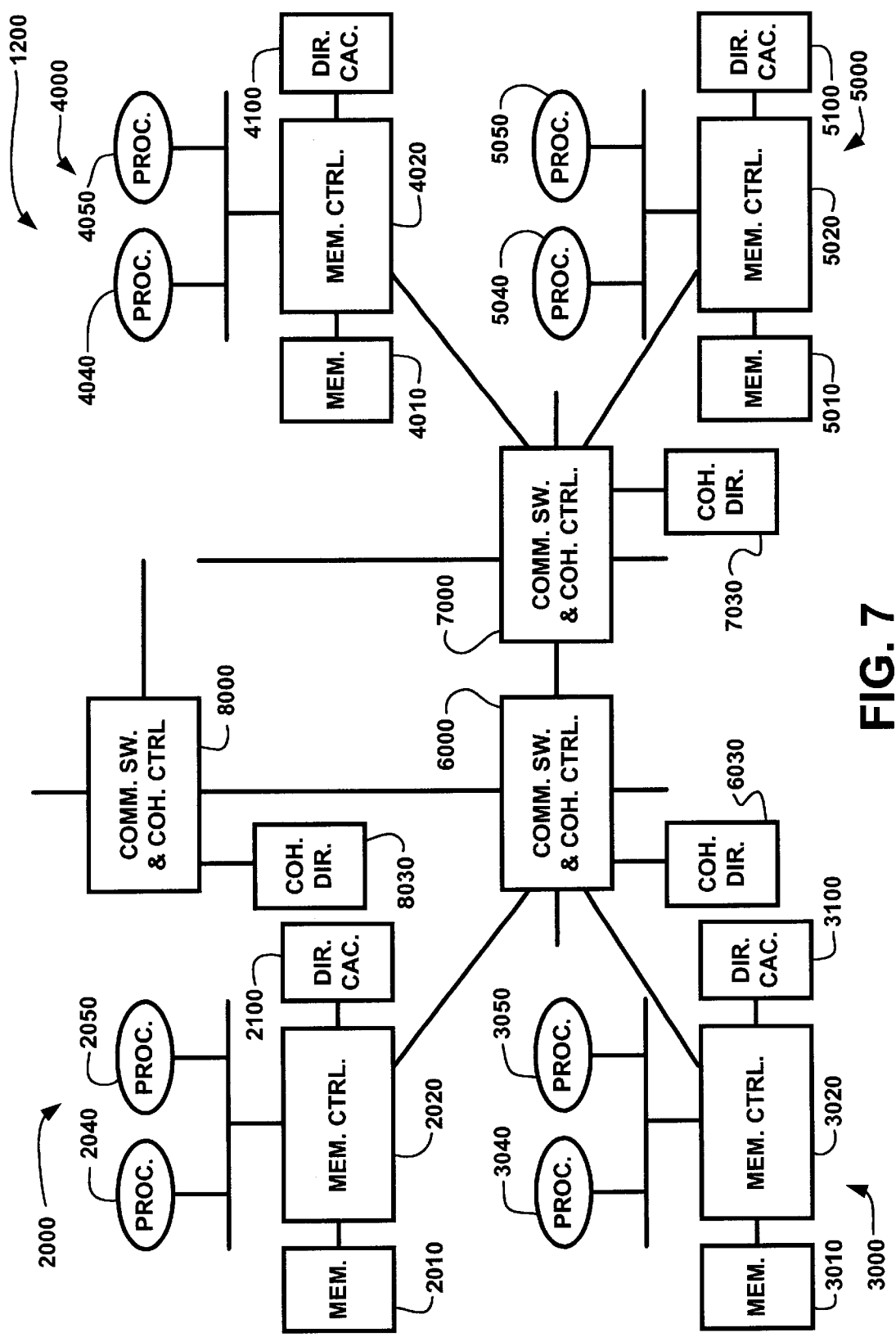
FIG. 7 is an alternate embodiment of the present invention with coherence directories at the communication switches and directory caches at the memory controllers.

Referring now to FIG. 7, therein is shown the ccNUMA system 1200 in which the latency of accessing the coherence directory can further be reduced by maintaining a small directory cache at each memory controller. The memory controllers 2020, 3020, 4020, and 5020 have respectively attached directory caches 2100, 3100, 4100, and 5100. The small directory cache indicates whether the memory line is valid in the local memory or not. With these directory caches 2100, 3100, 4100, and 5100, memory data can be supplied to the associated processor as soon as the directory cache indicates the data is valid without waiting for the response from the coherence controller at the communication switch. The directory cache and the coherence directory at the communication switch and coherency control can be maintained coherent.

In addition to servicing requests for memory lines, coherence controllers must also handle memory lines that are written back to memory by processors (mostly to free space in caches). When a coherence controller receives such a write back message in the ccNUMA system 1200, it forwards the data to the node maintaining the memory so that the memory is updated. The directory entry for that memory line is also updated to indicate that the value for the memory line in memory is valid.

Figure 8:
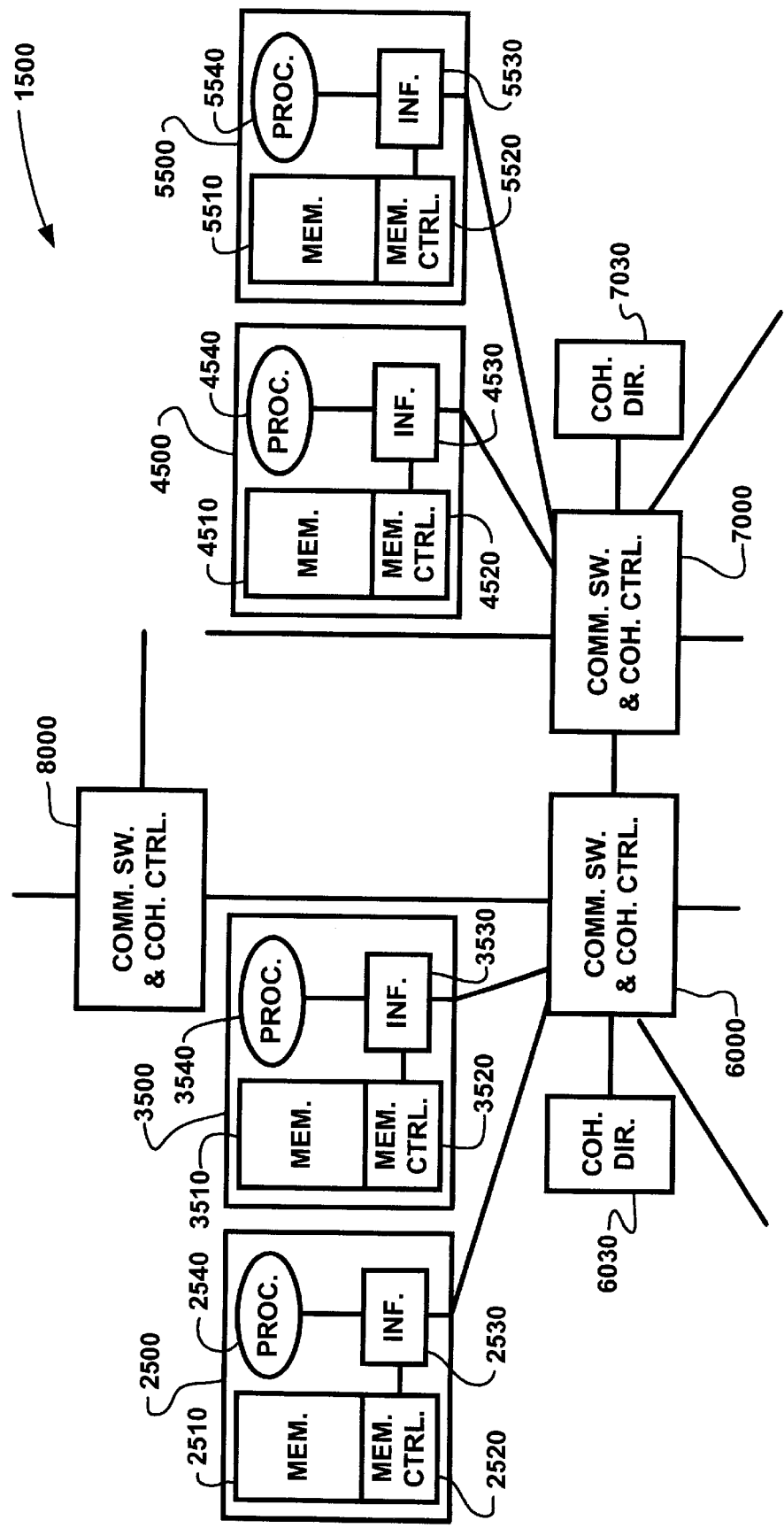
FIG. 8 is another alternate embodiment of the present invention where the memories are embedded in the processor chips.

Referring now to FIG. 8, therein is shown a ccNUMA system 1500 in which memory is embedded in a processor chip. Where appropriate, the same numbers are used to describe the same elements as in the ccNUMA system 1000. Processor architecture and technology trends are moving towards integrating memory, DRAMS or IRAM, on the processor chip. Even current processor architectures integrate the memory interface and memory controller on the processor chip. Thus, the ccNUMA system 1500 has processor chips 2500, 3500, 4500, and 5500 with respective memory units 2510, 3510, 4510, and 5510. The memory units 2510, 3510, 4510, and 5510 have respective memory controllers 2520, 3520, 4520, and 5520 operatively connected to them. The memory controllers 2520, 3520, 4520, and 5520 are further respectively operatively connected to memory interfaces 2530, 3530, 4530, and 5530. The memory interfaces 2530 and 3530 are operatively connected to processors 2540 and 3540, respectively, and to the communication switch and coherence controller 6000. Similarly, The memory interfaces 4530 and 5530 are operatively connected to processors 4540 and 5540, respectively, and to the communication switch and coherence controller 7000.

However, it is not desirable to locate the coherence controller on the processor chip since the coherence protocol must be adapted and optimized for the architecture of the overall system. The ccNUMA system 1500 has a coherence architecture, which is directly applicable to processors with integrated memory, since the coherence controller is not collocated with the memory controller.

It should be noted that the ccNUMA systems 1000 and 1500 could also simplify migration of pages when the pages are being moved between memory units associated with the same coherence controller. Page migration is a mechanism where a page of memory (several lines) is remapped to a new memory unit. Under some situations, migrating a page can improve overall system performance. In traditional architectures, when a page is migrated, the associated directory entries must also be relocated. This is typically a complex operation. With the new architecture, if the new memory page is being migrated between memory units that share the same coherence controller, the directory entries need not be relocated; only the memory data needs to be copied. This simplifies the process of page migration. Thus, a page can be easily migrated from memory unit 2010 in node 2000 (in FIG. 2) to the memory unit 3010 in node 3000 which shares the same coherence controller 6000.

It should further be noted that the ccNUMA systems 1000 and 1500 also have a lower overall cost. Since multiple memory units in the architecture share coherence controllers, fewer coherent controllers are needed in the entire system lowering system cost.

The present invention provides a new architecture for ccNUMA systems, but those having ordinary skill in the art would understand that the architecture is useable in other multi-processor computer systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A multi-processor computer system comprising:
   a plurality of memory units;
   a plurality of memory controllers operatively connected to said plurality of memory units;
   a plurality of processors operatively connected to said plurality of memory controllers;
   a plurality of nodes, each of said plurality of nodes formed from a group consisting of at least one of said plurality of memory units, memory controllers, processors, and a combination thereof;
   a communication switch connected to said plurality of nodes;
   a coherence controller operatively associated with said communication switch; and
   a coherence directory connected to said communication switch and said coherence controller for maintaining coherence information for said memory units in said plurality of nodes connected to said communication switch.

2. The multi-processor computer system as claimed in claim 1 including:
   a plurality of directory caches operatively connected to said plurality of memory controllers and maintaining coherency with said coherence directory.

3. The multi-processor computer system as claimed in claim 1 wherein:
   one of said plurality of nodes, each of said plurality of nodes formed from a group consisting of at least one of said plurality of memory units and connected to said communication switch, defines a home node;
   said home node contains a plurality of memory lines in one of said plurality of memory units;
   the others of said plurality of nodes, each of said plurality of nodes formed from a group consisting of at least one of said plurality of memory units and connected to said communication switch, define requesting nodes requesting copies of said plurality of memory lines; and
   said coherence directory maintains coherence information for said home node indicating the location of said copies of said plurality of memory lines in said requesting nodes.

4. The multi-processor computer system as claimed in claim 1 including:
   a second plurality of memory units;
   a second plurality of memory controllers operatively connected to said plurality of memory units;
   a second plurality of processors operatively connected to said plurality of memory controllers;
   a second plurality of nodes, each of said plurality of nodes formed from a group consisting of at least one of said second plurality of memory units, memory controllers, processors, and a combination thereof;
   a second communication switch connected to said second plurality of nodes and to said first communication switch;
   a second coherence controller operatively associated with said second communication switch; and
   a second coherence directory connected to said communication switch and said coherence controller for maintaining coherence information for said memory units in said second plurality of nodes connected to said second communication switch.

5. The multi-processor computer system as claimed in claim 4 including:
   a second plurality of directory caches operatively connected to said second plurality of memory controllers and maintaining coherency with said second coherence directory.

6. The multi-processor computer system as claimed in claim 5 wherein:
   said plurality of nodes, each of said plurality of nodes formed from a group consisting of at least one of said plurality of memory units and connected to said communication switch, defines a plurality of home nodes;
   said home nodes contain a plurality of original memory lines in each of said plurality of memory units;
   said plurality of nodes, each of said plurality of nodes formed from a group consisting of at least one of said plurality of memory units and connected to said first and second communication switches, further define requesting nodes requesting copies of said plurality of original memory lines;
   said first coherence directory maintains coherence information for said home nodes connected to said first communication switch and indicates the location of said copies of said plurality of memory lines in said requesting nodes; and
   said second coherence directory maintains coherence information for said home nodes connected to said second communication switch and indicates the location of said copies of said plurality of memory lines in said requesting nodes.

7. The multi-processor computer system as claimed in claim 1 wherein;
   one of said plurality of memory units, one of said plurality of processors, and one of said plurality of memory controllers are combined on a single semiconductor chip.

8. The multi-processor computer system as claimed in claim 1 wherein;
   one of said plurality of processors and one of said plurality of memory controllers are combined on a single semiconductor chip.

9. The multi-processor computer system as claimed in claim 1 wherein;
   said plurality of processors are combined on a single semiconductor chip.

10. A cache-coherent, non-uniform memory architecture multi-processor computer system comprising:
    plurality of memory units;
    a plurality of memory controllers, each of said plurality of memory controllers connected to one of said plurality of memory units;
    a plurality of processors, each of said plurality of processors connected to one of said plurality of memory controllers;
    a plurality of nodes, each of said plurality of nodes formed from a group consisting of at least one of said plurality of memory units, memory controllers, processors, and a combination thereof;
    an integrated communication switch and coherence controller connected to said plurality of nodes; and
    a coherence directory connected to said communication switch and said coherence controller for maintaining coherence information for said memory units in said plurality of nodes connected to said communication switch.

11. The cache-coherent, non-uniform memory architecture multi-processor computer system as claimed in claim 10 including;
a plurality of directory caches, each of said plurality of directory caches connected to one of said plurality of memory controllers and maintaining coherency with said coherence directory.

12. The cache-coherent, non-uniform memory architecture multi-processor computer system as claimed in claim 10 including;
one of said plurality of nodes, each of said plurality of nodes formed from a group consisting of at least one of said plurality of memory units, at least one of said plurality of memory controllers, at least one of said plurality of processors, and connected to said communication switch, defines a home node;
said home node contains a plurality of memory lines in one of said plurality of memory units;
the others of said plurality of nodes, each of said plurality of nodes formed from a group consisting of at least one of said plurality of memory units, at least one of said plurality of memory controllers, at least one of said plurality of processors, and connected to said communication switch, define requesting nodes requesting copies of said plurality of memory lines; and
said coherence directory maintains coherence information for said home node indicating the location of said copies of said plurality of memory lines in said requesting nodes.

13. The cache-coherent, non-uniform memory architecture multi-processor computer system as claimed in claim 10 wherein:
a second plurality of memory units;
a second plurality of memory controllers operatively connected to said plurality of memory units;
a second plurality of processors operatively connected to said plurality of memory controllers;
a second plurality of nodes, each of said plurality of nodes formed from a group consisting of at least one of said second plurality of memory units, memory controllers, processors, and a combination thereof;
a second communication switch connected to said second plurality of nodes and to said first communication switch;
a second coherence controller operatively associated with said second communication switch; and
a second coherence directory connected to said communication switch and said coherence controller for maintaining coherence information exclusively for said memory units in said second plurality of nodes connected to said second communication switch.

14. The cache-coherent, non-uniform memory architecture multi-processor computer system as claimed in claim 13 including:
a second plurality of directory caches, each of said second plurality of directory caches connected to one of said second plurality of memory controllers and maintaining coherency with said second coherence directory.

15. The cache-coherent, non-uniform memory architecture multi-processor computer system as claimed in claim 14 including:
said plurality of nodes, each of said plurality of nodes formed from a group consisting of at least one of said plurality of memory units and connected to said communication switch, defines a plurality of home nodes;
said home nodes contain a plurality of original memory lines in each of said plurality of memory units;
said plurality of nodes, each of said plurality of nodes formed from a group consisting of at least one of said plurality of memory units and connected to said first and second communication switches, further define requesting nodes requesting copies of said plurality of original memory lines;
said first coherence directory maintains coherence information for said home nodes connected to said first communication switch and indicates the location of said copies of said plurality of memory lines in said requesting nodes; and
said second coherence directory maintains coherence information for said home nodes connected to said second communication switch and indicates the location of said copies of said plurality of memory lines in said requesting nodes.

16. The cache-coherent, non-uniform memory architecture multi-processor computer system as claimed in claim 10 including:
one of said plurality of memory units, one of said plurality of processors, and one of said plurality of memory controllers are combined on a single semiconductor chip.

17. The multi-processor computer system as claimed in claim 10 wherein;
one of said plurality of processors and one of said plurality of memory controllers are combined on a single semiconductor chip.

18. The multi-processor computer system as claimed in claim 10 wherein;
said plurality of processors and one of said plurality of memory controllers are combined on a single semiconductor chip.

* * * * *